Patented Mar. 21, 1950

2,500,983

UNITED STATES PATENT OFFICE 2,500,983

EMULSION POLYMERIZATION PROCESS AND PRODUCT

Per K. Frolich and Byron M. Vanderbilt, Westfield, and Miller W. Swaney, Cranford, N. J., assignors to Standard Oil Development Company, a corporation of Delaware No Drawing. Application December 28, 1945, Serial No. 637,782

15 Claims. (Cl. 106—243)

This invention pertains to the preparation of liquid products by the polymerization of conjugated diolefins or mixtures containing conjugated diolefins in aqueous emulsion.

It has long been known that highly plastic rubber-like polymers can be synthesized from diolefins and from diolefin-vinyl compound mixtures by the action of sodium or other alkali metals or by peroxides by the so-called mass polymerization and also by polymerization in aqueous emulsion. The latter is the process most widely used at the present time and consists essentially of emulsifying one part of the monomer or mixture of monomers in the desired ratio in about one to two parts of water containing about 0.25 to about 5% based on the water phase of an emulsifier such as a water-soluble soap or a sulfonate-type surface active agent. Polymerization is catalyzed by a trace of a per-type compound which is active under the reaction conditions such as hydrogen peroxide, benzoyl peroxide, perborates and persulfates of ammonia and the alkali metals. Ordinarily there is provided in the reaction mixture about 0.1 to 1.0% based on the reactants of a polymerization modifier or promoter such as aliphatic mercaptans like dodecyl mercaptan. The pH of the emulsion is usually adjusted to between about 7 and 10 when using soap type emulsifiers but the reaction may be conducted at a pH below 7 when using acid type emulsifiers such as dodecyl amine hydrochloride and the condensation products of ethylene oxide with high molecular weight aliphatic carboxylic acids, amines and the like. The polymerization is carried out at temperatures of between about 20–50° C. until about 75% conversion of the unsaturated monomers to high molecular weight polymers is effected. The resultant polymers, which are rubbery to resinous in nature are separated from the resultant latices by coagulation with brine or acid or by freezing or the like whereupon the polymer is washed and dried. These polymers find general application as resins or as vulcanizable rubbery materials, a small portion thereof finding application in dissolved form as adhesives and the like.

It is the object of this invention to prepare certain novel emulsion polymerizates.

It is also the object of this invention to prepare emulsion polymerizates of conjugated diolefins which are liquid in nature and adaptable for use as drying oils, plasticizers and the like.

These and other objects will appear more clearly from the following detailed description and claims.

It has now been found that by proper control of the reaction conditions it is possible to prepare liquid polymers from conjugated diolefins such as butadiene, isoprene, piperylene, dimethyl butadiene, methyl pentadiene, or the like and from mixtures of a major proportion of such conjugated diolefins and a minor proportion of an unsaturated comonomer such as styrene, alpha methyl styrene, alpha methyl para methyl styrene, halogenated styrenes such as chlorinated and brominated styrenes, acrylonitrile, methacrylonitrile, acrylic- and methacrylic acid esters such as methyl acrylate and methyl methacrylate, fumaric acid esters such as ethyl fumarate and unsaturated ketones such as methyl vinyl ketone and methyl isopropenyl ketone.

The preparation of liquid polymers is accomplished by employing one or more of the following conditions:

(1) Use of a relatively high concentration (i. e. at least 3 wt. per cent based on the monomers) of an aliphatic mercaptan type polymerization modifier.

It is preferable to use more than 3% of mercaptan regulator (based on monomers) of combined chain length of at least 5 carbon atoms, and the amount may vary between 3% and 10–12% depending upon the specific mercaptan employed and the particular type of polymeric oil sought. Tertiary mercaptans are preferred to the primary or secondary mercaptans, but all three types may be advantageously employed. For a typical reaction about 3–8% of the tertiary mercaptan derived from the dimer of isobutylene may be used, or about 5–10% of the tertiary mercaptans derived from the trimer of isobutylene may be employed, or in still another case about 7–12% of the tertiary mercaptans derived from the tetramer of isobutylene. It is preferred not to use mercaptans of greater than $C_{16}$ carbon chain content and these should ordinarily be of the tertiary type. In the case of primary mercaptans it is ordinarily preferred to use compounds containing not more than about 12 carbon atoms. The preferred mercaptan for our purposes is the tertiary mercaptan prepared from diisobutylene (isobutylene dimer). The mercaptan modifying agent may be replaced in whole or in part with other modifying agents such as alkyl xanthogen polysulfides although these reagents are less desirable than the mercaptans since they tend to decrease the reaction rate very appreciably. The modifier may be added to the reaction mixture at the start of the reaction or only a part of the modifier may be added initially and the remainder may be added portionwise during the reaction. The latter procedure is especially desirable when carrying the reaction to substantial completion.

(2) Use of a highly unsaturated fatty acid for preparing the soap emulsifier. For this purpose we propose to use the fatty acids such as are obtained from linseed or soybean oils. By using soaps of highly unsaturated fatty acids it is possible to reduce the amount of mercaptan or other polymerization modifier. The amount of emulsifier is about 0.25 to about 5 wt. per cent and the amount of polymerization catalyst is about 0.1 to about 1 wt. per cent based upon the monomers.

Although the polymerization in accordance with the present invention can be carried out at a temperature as low as about 30° C., it is generally preferred to carry out the reaction at temperatures which are somewhat above that usually maintained in the production of solid rubbery polymers but which varies with the type of polymerization carried out. When preparing liquid polybutadiene by this method we can operate at temperatures as high as 60–70° C. and we prefer the range of 50–55° C., whereas when making an oily copolymer of butadiene and acrylonitrile a temperature of 35–40° C. is preferred. However, in most cases it is advantageous in these polymerization reactions to utilize polymerization promoters such as low molecular weight amines, alkali ferricyanides, inorganic cyanides and the like in which cases the temperatures employed can be substantially lowered.

The recovery of the liquid polymers formed in accordance with the present invention presents certain problems which are not encountered in in the recovery of solid rubbery polymers and accordingly the recovery is somewhat different than the ordinary processes for removing rubber-like polymers from their respective latices. For example, if the emulsion is broken with a water-soluble salt such as sodium chloride brine or the like, the brine layer removed and the oil washed with water to remove soap, considerable trouble is encountered because of the tendency to reform an emulsion of the liquid polymer oil. The following are the preferred methods for coagulating and washing the oil polymers:

The emulsion is broken with sodium chloride brine and an acid such as acetic or sulfuric acid and with sufficient of the acid to convert all of the soap to free fatty acids. The water layer is then removed and the oil layer washed with water. This technique is suitable when there is no objection to leaving the free fatty acids in the polymer as when it is desired to use the liquid polymer as a drying oil. In this case it is desirable to use fatty acids of the linseed oil type for preparing the soap emulsifier.

In cases where it would be undesirable to retain free fatty acids in the liquid polymer the emulsifier may be converted into an insoluble salt and filtered from the water and oil layers. A brief washing of the polymer layer then suffices to remove extraneous materials.

The liquid polymer may also be recovered by breaking the emulsion by means of a water-soluble organic liquid such as isopropyl alcohol or a combination of brine and alcohol. In this way, the emulsifier is retained at least partially in the aqueous phase thereby facilitating its separation from the polymer. Further washing with alcohol removes any soap or fatty acid left in the polymer.

The polymers prepared in accordance with the present invention are liquid oily materials even when the reaction is carried to 80–90% monomer conversion and have an intrinsic viscosity of between about 0.05 and 0.4. The oily liquid polybutadiene products ordinarily have an intrinsic viscosity between about 0.1 and 0.2 while the oily liquid copolymers of butadiene and styrene prepared in accordance with this invention have an intrinsic viscosity of between about 0.20 and 0.40. The liquid oily polymers formed are completely soluble in benzene. Upon the addition of 99% isopropyl alcohol to benzene solutions of the polymer, no rubbery material is precipitated.

The following examples are illustrative of the present invention.

Example 1

The following charge was placed in a one quart pressure bottle.

| | Grams |
|---|---|
| Water | 400 |
| Butadiene | 200 |
| Tallow acids soap (100% neut.) | 10 |
| Potassium persulfate | 0.6 |
| Octyl mercaptan (prepared from isobutylene dimer) | 8 |

The bottle containing this charge was placed on a rotating wheel in a water bath maintained at 55° C. and mixed for 20 hours. The reaction mixture was short-stopped with hydroquinone and unreacted butadiene stripped off with live steam. The latex was coagulated with brine and washed several times with water containing 10% of isopropyl alcohol. The adhering alcohol was removed by aerating with nitrogen preheated in a steam coil. The product was obtained in about 80% yield and upon washing was a clear pale yellow viscous oil which had an iodine number of over 400. When mixed with 3% of sulfur and 0.5 part of tetramethyl thiuram disulfide and heated at 287° F. for 2 hours the oil had cured to a hard solid.

Example 2

The following charge was placed in a pressure bottle reactor:

| | Parts |
|---|---|
| Butadiene | 74 |
| Acrylonitrile | 26 |
| Water | 200 |
| Sodium soap of tallow acids | 3.6 |
| Free tallow acids | 0.4 |
| Diisobutylene mercaptan | 4 |
| $K_2S_2O_8$ | 0.3 |
| Morpholine | 0.1 |

Reaction carried out by mounting the pressure bottle on a rotating wheel and maintaining it at 25° C. for 16½ hours. The latex obtained was short-stopped by means of 0.5% of 2 6-dibutyl-4-methyl phenol, the unreacted monomers removed by stripping with steam under vacuum, and then coagulated by means of sodium chloride and isopropyl alcohol. The oil layer was washed with water and alcohol and dried in a vacuum oven at 70° C. A yield of liquid polymer was obtained which was equivalent to a 74% conversion of monomers. The product proved to be a good plasticizer for Perbunan, a rubbery emulsion copolymer of butadiene-acrylonitrile.

Example 3

Example 2 was repeated except that 74 parts of isoprene were substituted for 74 parts of butadiene. Since the isoprene was only 96% pure it required 21 hours at 26° C. to reach a conversion of 77%. The polymer was an oil but was somewhat more viscous at room temperature than was the copolymer obtained in Example 2.

Example 4

Example 1 was repeated except that the 8 parts of octyl mercaptan were replaced with 12 parts of a mixture of mercaptans (predominantly $C_{12}$) derived from commercial dodecyl alcohol. After 16 hours at 50° C., the unreacted butadiene was allowed to flash off and the latex was coagulated by means of brine and isopropyl alcohol. The lower aqueous layer was removed and the upper layer acidified with 20 cc. of 5% $H_2SO_4$. It was then washed twice with water and then twice with alcohol. It was then dried by heating to a maximum temperature of 125° C. The oil obtained was clear and set up to a hard film when spread on a glass plate and heated in a steam oven over night.

It may be noted that more mercaptan is required when using the dodecyl mercaptan as compared to when using the octyl. However, when using the former a faster reaction rate is obtained.

Example 5

Example 1 was repeated but modified in that 100 parts of the butadiene were replaced with 100 parts of styrene. A conversion of 75% was reached after 14 hours at 55° C. to give a sirupy liquid which was somewhat more viscous than the oil obtained from butadiene alone. The oily butadiene-styrene copolymer was compatible with the rubbery butadiene-styrene copolymer (Buna S. or GR-S) and proved to be a good processing aid for the Buna S when used in proportion of 5 to 50 parts of oil with 100 parts of the rubber.

Example 6

It was found advantageous to add a part of the modifier portionwise during the reaction period. The following run is typical of several carried out in a 3-gallon autoclave which was equipped with turbine type agitation and a blow case suitable for making additions during the reaction period.

The following charge was used:

| | Grams |
|---|---|
| Butadiene | 3000 |
| Water | 6000 |
| Tallow acid soap | 120 |
| Potassium persulfate | 9 |
| Potassium ferricyanide | 4.5 |
| Diisobutylene mercaptan | 90 |

The synthesis was carried out at 45° C. After 5 hours at this temperature an additional 30 grams of mercaptan were added and a like addition was made after 7 hours. After 9 hours a conversion of approximately 75% had been reached. The latex was short-stopped with 6.6 grams of hydroxylamine hydrochloride and the unreacted butadiene distilled off. The latex was coagulated with isopropyl alcohol and the resultant oil layer washed several times with alcohol. The adhering alcohol was removed by heating on a steam bath. The 2235 grams of clear sirupy oil obtained was found to have an intrinsic viscosity of 0.18 and formed a hard film when mixed with 0.5% of cobalt naphthenate and heated for 3 hours at 400° F.

The polymeric oils prepared in accordance with the present invention are of value as softeners and plasticizers for natural and synthetic rubbers. By proper selection of the modifying agent and regulating the amount thereof used, an oil of any desired viscosity can be obtained. Oily polymers prepared from a conjugated diolefin and a nitrile such as acrylonitrile are especially suited for plasticizing oil resistant rubbers of the Perbunan type. For softening the more saturated materials such as high molecular weight, solid polyisobutylenes, it is desirable to hydrogenate the liquid polymers of the present invention to get partial or complete hydrogenation.

The polymeric oils in accordance with the present invention are also valuable as drying oils. Drying agents or siccatives such as cobalt and manganese naphthenates can be advantageously used to facilitate drying of paint films or the like prepared from these oils. For reasons of economy it is preferred to prepare such oils from butadiene but copolymers such as those from butadiene and acrylonitrile are especially advantageous when oil insolubility of the dried film is desired.

These polymeric oils are also of commercial interest for the preparation of derivatives. Reaction with such reagents as halogens, halogen acids, maleic anhydride, stannic chloride, sulfur, sulfur chloride and phosphorus pentasulfide and the like lead to valuable products.

The foregoing description contains a limited number of embodiments of the present invention. It will be understood however that this invention is not limited to the specific conditions described since numerous variations are possible without departing from the scope of the following claims.

What we claim and desire to secure by Letters Patent is:

1. The process which comprises heating a conjugated diolefin of 4 to 6 carbon atoms per molecule in aqueous emulsion at a temperature between 25 and 70° C. for a period not exceeding 21 hours in the presence of about 3 to 12% based on the monomers of a $C_6$ to $C_{16}$ tertiary aliphatic mercaptan until a liquid, oily polymer having an intrinsic viscosity between 0.05 and 0.4 is formed.

2. A process according to claim 1 wherein a water soluble, highly unsaturated, higher fatty acid soap is used as emulsifier.

3. The process which comprises heating a mixture of a major proportion of a conjugated diolefin of 4 to 6 carbon atoms per molecule and a minor proportion of a monoethylenically unsaturated comonomer in aqueous emulsion at a temperature between 25 and 70° C. for a period not exceeding 21 hours in the presence of about 3 and 12% based on the monomers of a $C_6$ to $C_{16}$ tertiary aliphatic mercaptan until a liquid, oily polymer having drying properties and having an intrinsic viscosity between 0.05 and 0.40 is formed.

4. A process according to claim 3 wherein the diolefin is butadiene-1,3, the comonomer is styrene and the mercaptan is diisobutylene mercaptan.

5. A process according to claim 3 wherein the diolefin is butadiene-1,3, the comonomer is acrylonitrile and the mercaptan is diisobutylene mercaptan.

6. The process for preparing oily polymers which comprises heating a conjugated diolefin of 4 to 6 carbon atoms per molecule in aqueous emulsion at a temperature between 25 and 60° C. for a period between 9 and 21 hours in the presence of 3 to 8% based on the monomers of a $C_6$ to $C_{12}$ tertiary aliphatic mercaptan, and in the presence of a water soluble soap of a highly unsaturated, higher fatty acid, breaking the emulsion by means of brine and sufficient acetic acid to convert all of the soap into free fatty acid and a water soluble acetate, separating the oil layer from the water layer and washing the separated oil with water.

7. The process for preparing oily polymers which comprises heating a major proportion of a conjugated diolefin of 4 to 6 carbon atoms and a minor proportion of acrylonitrile in aqueous emulsion at a temperature between 25 and 60° C. for a period between 9 and 21 hours in the presence of 3 to 8% based on the monomers of diisobutylene mercaptan and in the presence of a water soluble soap emulsifier, breaking the emulsion with a salt which converts the soap emulsifier to an insoluble salt, filtering the insoluble salt from the liquid, separating the oil layer from the water layer and washing the separated oil with water to remove extraneous material therefrom.

8. The process for preparing oily polymers which comprises polymerizing a major proportion of butadiene-1,3 and a minor proportion of acrylonitrile in aqueous emulsion at a temperature between 25 and 60° C. for a period not exceeding 21 hours in the presence of 3 to 8% of diisobutylene mercaptan and in the presence of a water soluble soap of a highly unsaturated, higher fatty acid until a liquid oily polymer having drying properties and having an intrinsic viscosity between 0.05 and 0.40 is formed, breaking the emulsion by means of isopropyl alcohol, separating the oil layer from the water layer and washing the separated oil with water to remove extraneous materials.

9. The process of preparing oily polymers which comprises heating 100 parts of butadiene-1,3 in aqueous emulsion at a temperature between 45 and 55° C. for a period of 9 to 21 hours in the presence of 3 to 8 parts of diisobutylene mercaptan, about 0.15 part of potassium ferricyanide and about 0.3 part of potassium persulfate, coagulating the resulting latex with isopropyl alcohol, separating the oil phase from the water phase, washing the oil product with isopropyl alcohol, and evaporating residual alcohol from the washed oil product.

10. An oily, siccative polymer having an intrinsic viscosity between 0.05 and 0.4 and prepared according to the process defined by claim 1.

11. An oily, siccative polymer having an intrinsic viscosity between 0.05 and 0.4 and prepared according to the process defined by claim 2.

12. An oily, siccative polymer having an intrinsic viscosity between 0.05 and 0.40 and prepared according to the process defined by claim 3.

13. A liquid, oily polymer having an intrinsic viscosity between 0.05 and 0.40 and prepared according to the process defined by claim 5.

14. A composition comprising a free, highly unsaturated, higher fatty acid and an oily, siccative polymer having an intrinsic viscosity between 0.05 and 0.40, said composition being obtained by polymerizing a conjugated diolefin of 4 to 6 carbon atoms per molecule to a conversion of up to 90% of monomer at a temperature between 25 and 70° C. for a period not exceeding 21 hours in aqueous emulsion in the presence of 3 to 8% based on the monomer of a $C_6$ to $C_{16}$ tertiary aliphatic mercaptan and in the presence of a water soluble, highly unsaturated, higher fatty acid soap emulsifier, breaking the reacted emulsion by means of brine and sufficient acid to convert all of the soap emulsifier to free fatty acid, separating the oil layer from the water layer and washing the oil layer to remove extraneous material therefrom.

15. A composition comprising a free, highly unsaturated, higher fatty acid and an oily, siccative polymer having an intrinsic viscosity between 0.05 and 0.40, said composition being obtained by polymerizing a major proportion of butadiene-1,3 and a minor proportion of acrylonitrile at a temperature between 35 and 45° C. for a period not exceeding 21 hours in aqueous emulsion in the presence of 3 to 8% based on the monomers of diisobutylene mercaptan and in the presence of a water soluble, highly unsaturated, higher fatty acid soap emulsifier, breaking the reacted emulsion by means of brine and sufficient acid to convert all of the soap emulsifier to free fatty acid, separating the oil layer from the water layer and washing the oil layer to remove extraneous materials therefrom.

PER K. FROLICH.
BYRON M. VANDERBILT.
MILLER W. SWANEY.

REFERENCES CITED

The following references are of record in the file of this patent:

UNITED STATES PATENTS

| Number | Name | Date |
|---|---|---|
| 1,950,438 | Carothers | Mar. 13, 1934 |
| 2,137,584 | Ott | Nov. 22, 1938 |
| 2,227,517 | Starkweather | Jan. 7, 1941 |
| 2,281,613 | Woltham et al. | May 5, 1942 |
| 2,300,056 | Meis et al. | Oct. 27, 1942 |
| 2,351,108 | Collins | June 13, 1944 |
| 2,390,105 | Mack | Apr. 9, 1946 |